(12) United States Patent
Lu

(10) Patent No.: US 11,778,373 B2
(45) Date of Patent: Oct. 3, 2023

(54) MICROPHONE ARRAY AND SELECTING OPTIMAL PICKUP PATTERN

(71) Applicant: Tymphany Worldwide Enterprises Limited, Grand Cayman (KY)

(72) Inventor: Ryan Meng-Wei Lu, Grand Cayman (KY)

(73) Assignee: TYMPHANY WORLDWIDE ENTERPRISES LIMITED, Grand Cayman (KY)

( * ) Notice: Subject to any disclaimer, the term of this patent is extended or adjusted under 35 U.S.C. 154(b) by 0 days.

(21) Appl. No.: 17/647,328

(22) Filed: Jan. 6, 2022

(65) Prior Publication Data

US 2023/0217164 A1 Jul. 6, 2023

(51) Int. Cl.
*H04R 3/00* (2006.01)
*H04R 1/40* (2006.01)
(Continued)

(52) U.S. Cl.
CPC ............ *H04R 3/005* (2013.01); *G06F 3/165* (2013.01); *G10L 25/78* (2013.01); *H04R 1/406* (2013.01); *H04R 29/005* (2013.01)

(58) Field of Classification Search
CPC ..... H04L 63/0861; H04L 63/20; H04R 1/406; H04R 3/005; H04R 1/02; H04R 1/025; H04R 1/265; H04R 1/40; H04R 1/403; H04R 19/04; H04R 2201/003; H04R 2201/401; H04R 2201/405; H04R 2430/21; H04R 2430/25; H04R 2499/13; H04R 3/04; H04R 3/12; H04R 5/02; H04R 5/027; H04R 5/04; H04R 1/326; H04R 2201/40; H04R 2410/01; H04R 2430/20; H04R 2499/11; H04S 2400/15; H04S 7/303; H04S 2400/13; H04S 3/008; H04S 7/301; H04S 7/305; G10L 21/0232; G10L 15/26;
(Continued)

(56) References Cited

U.S. PATENT DOCUMENTS

| 10,397,697 B2 * | 8/2019 | Lambert | ................ H04R 3/005 |
| 2015/0230025 A1 * | 8/2015 | Loether | ................. H04R 27/00 |
| | | | 381/79 |

(Continued)

*Primary Examiner* — Lun-See Lao
(74) *Attorney, Agent, or Firm* — Muncy, Geissler, Olds & Lowe, P.C

(57) ABSTRACT

A microphone array is configured to select an optimal pickup pattern of a microphone array including at least two microphones each associated with a predefined microphone pickup pattern. The optimal pickup pattern is selected from a list of predefined pickup patterns including the predefined microphone pickup patterns and predefined mixed pickup patterns. A method of selecting an optimal pickup pattern includes receiving microphone audio signals from the microphones to establish a plurality of microphone audio signals and mixing them in accordance with the plurality of predefined mixed pickup patterns to establish a plurality of mixed audio signals. Individual level characteristics of respective individual microphone audio signals and of respective individual mixed audio signals are determined, and an optimal pickup pattern is selected from the list of predefined pickup patterns based on the individual level characteristics.

20 Claims, 3 Drawing Sheets

(51) Int. Cl.
*G10L 25/78* (2013.01)
*G06F 3/16* (2006.01)
*H04R 29/00* (2006.01)

(58) Field of Classification Search
CPC ............. G10L 17/00; G10L 2015/228; G10L 2021/02165; G10L 2021/02166; G10L 21/0216; H04N 13/383; H04N 5/23212; H04N 5/23293; H04N 5/23296; H04N 7/147; G10K 11/17823; G10K 2200/10; G10K 2210/1082; G10K 2210/12
USPC .......................................................... 381/92
See application file for complete search history.

(56) References Cited

U.S. PATENT DOCUMENTS

| | | | | |
|---|---|---|---|---|
| 2019/0373362 | A1* | 12/2019 | Ansai | H04R 1/265 |
| 2020/0312316 | A1* | 10/2020 | Kano | G10L 15/22 |
| 2022/0351742 | A1* | 11/2022 | Popovic | H04R 1/406 |

* cited by examiner

| 3 | Mixer block |
| 5 | Audio analyzer block |
| 15 | Pick up patterns |

MICROPHONE ARRAY AND SELECTING OPTIMAL PICKUP PATTERN

Field of the invention

The present invention relates to a microphone array and to a method of selecting an optimal pickup pattern of a microphone array.

BACKGROUND OF THE INVENTION

A microphone is characterized by a certain polar pattern/pickup pattern, which describes its sensitivity to sounds arriving from different angles relative to the central axis of the microphone. One of the most common pickup patterns is the cardioid pickup pattern, which provides a high sensitivity at one side of the microphone, while rejecting sound from the opposite side of the microphone. Thereby, a voice may be efficiently picked up by the microphone at the sensitive side, while environmental noise and disturbances is rejected from other directions. With an array of microphones, advanced beamforming techniques can be applied to direct the sensitivity of the microphone array in different directions, to enhance sound acquisition in specific directions. Forming a beam that provides sensitivity in the right direction with respect to a sound can vastly improve the sound acquisition of that sound and, e.g., diminish the signal-to-noise ratio. On the other hand, forming a beam that is not a good fit for a given situation results in suboptimal or even unusable sound acquisition. However, beamforming techniques are very flexible in that a beam is modified during, e.g., a recording of a sound according to certain parameters, and thereby this technique can render the sensitivity of beam forming microphone systems unpredictable for a user who is used to using regular microphones. For example, the system may limit the dynamics of a recording by constantly adjusting sensitivity (beam) according to the sound, and thereby diminishing the dynamics that may occur when, for example, the a voice changes position relative to the microphone array. Moreover, beamforming techniques require a substantial amount of computer processing power. Also, choosing the best beam or the best pickup pattern of microphone array for a given situation is difficult, and requires substantial knowledge of microphone pickup patterns as well as great experience with the task.

SUMMARY OF THE INVENTION

The inventors have identified the above-mentioned problems and challenges related to microphones, and subsequently made the below-described invention, which may provide advantageous microphone systems.

The invention relates to a microphone array, and to a method of selecting an optimal pickup pattern of a microphone array.

By having a microphone array capable of selecting an optimal pickup pattern, sound may advantageously be recorded with an optimal pickup pattern that is highly sensitive toward the direction of that particular sound, while being less sensitive to sound emanating from other directions (ambient noise). By rejecting such ambient noise, while still providing a high sensitivity towards a sound, an optimal signal to ambient noise ratio may advantageously be achieved. Thereby, users of the invention will appreciate that the invention advantageously makes it possible to record a sound, e.g., a voice, in a noise environment using an optimal pickup pattern, which is highly sensitive toward the sound (e.g., the voice of the user), while at the same time being capable of effectively deflecting noise from other directions to minimize contamination of the recorded audio signal with that noise. Furthermore, the user will greatly appreciate that the microphone array of the invention may in embodiments of the invention automatically adapt to different recording situations by automatically switching to the optimal pickup pattern of a list of predefined pickup patterns.

Advantageously, the method of selecting an optimal pickup pattern requires little processing power and it may, therefore, be implemented in multiple different systems and applications where optimizing sound recording is relevant. Thus, systems not capable of utilizing classical complicated beamforming approaches due to, e.g., little processing power may advantageously utilize the microphone array of the invention.

Also, the invention may provide a stable optimal pickup pattern during recording, as opposed to classical beamforming approaches, wherein a beam is constantly steered towards a specific identified sound source. This has the advantage that, e.g., when a singer or a speaker utilizes the method of the invention for recording voice, the singer/speaker may, as with a traditional microphone, be able to utilize the dynamic changes in recorded audio level that occur when the singer/speaker moves in relation to the microphone array to add dynamics to the recorded sound. For example, the recorded audio signal becomes lower when, e.g., the singer/speaker purposely moves to one side of the microphone array and/or moves further away from the microphone array. Thus, users of the invention will appreciate that the method of the present invention may decrease ambient noise by utilizing an optimal pickup pattern that is sensitive towards, e.g., a voice of the user, while at the same time, providing similar dynamics and a similar user experience as traditional microphones.

Advantageously, embodiments of the invention may comprise an audio switch, capable of automatically switching from an active pickup pattern to the selected optimal pickup pattern. This advantageously has the effect that the optimal pickup pattern is always applied without any need for user instruction, which is advantageous. Furthermore, this enables users with no experience of recording with different pickup patterns to achieve sound recording with an optimal quality, by ensuring that the user is always utilizing an optimal pickup pattern.

A further feature of an embodiment of the invention is that the optimal pickup pattern is selected based on predefined pickup patterns, and thereby individual audio signals associated with these individual predefined pickup patterns can be established simultaneously, while still using little processing power. By establishing all these individual audio signals simultaneously, the microphone array of the invention is able to switch seamlessly between pickup patterns, and if an audio switch is implemented, potentially also to switch seamlessly between audio signals associated with the different predefined pickup patterns, without a user or a listener experiences any perceivable latency. This feature may advantageously, e.g., be utilized in situations where the microphone array of the invention is utilized by more than one user and wherein these users are positioned differently with respect to the microphone array. An example of such situation could be an interview situation, wherein the invention may select an optimal pickup pattern to be used when the interviewer is speaking, while automatically selecting a different optimal pickup pattern when the person that is interviewed is speaking. Since all these pickup patterns are predefined, the microphone array is advantageously capable of switching between audio signals associated with the two optimal pickup patterns related to the respective two users, without the users and/or other people listening to, e.g., an output of the microphone array experiencing any perceivable latency. In a similar situation, a bi-polar pickup pattern may be selected as optimal pickup pattern, since this pickup pattern is sensitive to sound in two opposite directions. Thereby the voice of an interviewer and the person being interviewed and sitting in front of the interviewer, may be recorded, while ambient noise from the sides are advantageously minimized.

In advanced embodiments of the invention, voice activity detection may be applied to identify a voice in the recorded audio signals. The level of the identified voice may then be measured and thereby the pickup pattern that provides the audio signal with the highest level of the identified voice may be selected as the optimal pickup pattern. Thereby, in this configuration the microphone array may advantageously be particular sensitive to voices, while deflecting other sounds. By utilizing premeasured data of voices or of other sounds, including, e.g., different instrument sounds, the voice activity detection may be tailored to recognize particular sounds such as voices and/or different instruments, and thereby the optimal pickup pattern of the invention can be selected such that it is sensitized toward these different premeasured sounds, which is advantageous.

BRIEF DESCRIPTION OF THE DRAWINGS

Various embodiments of the invention will in the following be described with reference to the drawings where.

DETAILED DESCRIPTION

Figure 1:
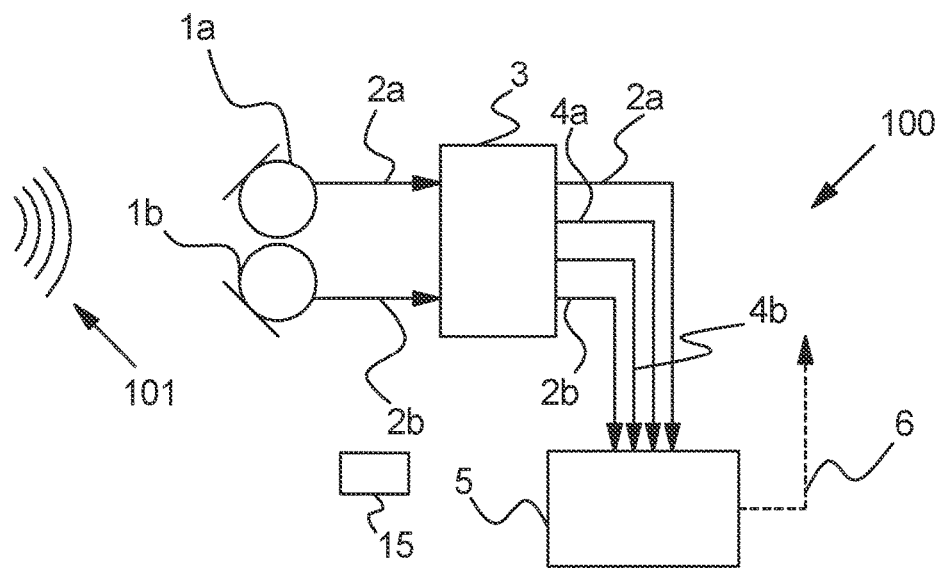
FIG. 1 illustrates a block diagram of a microphone array according to an embodiment of the invention.

In the following, various concepts of the invention are presented without reference to particular embodiments.

A microphone array according to the present invention may comprise at least two microphones, an audio mixer block, an audio analyzer block and predefined pickup patterns. The mixer block and audio analyzer block are configured to determine an optimal pickup pattern among the predefined pickup patterns, based on the recorded microphone audio signals. The mixer block, audio analyzer block and predefined pickup patterns may be comprised by an audio processing unit. The audio processing unit may have memory comprising predefined pickup patterns, and a processor configured to perform instructions (actions) stored in the memory. The audio processing unit is preferably a digital signal processor. However, the invention may also be implemented utilizing analog audio processing, depending on the particular implementation of the invention. The audio processing unit may be arranged in an enclosure together with the microphones. Yet, in some embodiments, the microphones and the audio processing unit may be arranged in separate enclosures, to enable microphones to be positioned away from the audio processing unit, which can be advantageous in some situations. For example, in recording situations in a studio where the audio processing unit may be positioned in a control room so that a user may control the microphone array of the invention from the control room, while the microphones are positioned in, e.g., a recording room to record instruments or a singers voice. Similarly, during live performances, the microphones may be positioned on stage to record sound, while the audio processing unit is positioned in, e.g., a stage rack unit or similar, or in a mixer tower. Similarly, when implemented in automobile audio systems, e.g., to be used for sound recording during, e.g., telephone calls, the audio processing unit may be positioned separately from the microphones of the invention.

As will be discussed in greater depth in the following sections, the microphone array may comprise several different types of microphones, and microphones with different pickup patterns. The microphones can be positioned to record sound from various different directions, and the microphones may be physically arranged to point in different directions relative to each other. The microphones record audio and provide a microphone audio signal comprising a representation of a sound recorded with the microphone. Microphone audio signals are typically initially analog signals provided by the microphones of the microphone array. These analog microphone audio signals may be mixed, processed and/or analyzed in the analog domain, however, in preferred implementations of the invention, microphone audio signals are converted to a digital audio signal by an analog to digital converter, to enable mixing of audio signals, audio signal processing and audio signal analysis in the digital domain. Thus, it should be understood that when referring to a microphone audio signal, this signal can be an analog audio signal or a digital audio signal, depending on the particular implementation of the invention. Thus, an audio signal may be a digital signal even if an analog to digital converter is not shown or mentioned in relation to a description of a microphone audio signal.

It should be understood that in some embodiments of the invention, part of the audio processing/audio mixing/audio analyzes may be performed in the analog domain, whereas different part of the same may be performed in the digital domain. For example, in particular embodiments of the invention, a mixer block may be an analog mixer block that provides analog signals to an audio switching block and to an audio analyzer block, while the audio signals to the audio analyzer block is converted to digitals signals prior to analysis, the audio switching block receives analog audio signals. When the audio analyzer block has selected an optimal pickup pattern based on the digitalized audio signals, the audio analyzer block may instruct the switcher to select the analog audio signal associated with the selected optimal pickup pattern as an audio output signal. Thereby, advantageously any aliasing or noise, which may occur during analog to digital conversion and/or vice versa, is avoided since the audio output signals that may be provided as audio output signals remains in the analog domain. Such analog bypass system of the analog audio may, thus, advantageously provide improved sound quality.

Any microphone has a certain pickup pattern, which describes its directional sensitivity. The pickup pattern is an inherent feature of the microphone that depend on various parameters related to the configuration and construction of the microphone, including the particular microphone type (technology), materials used, dimension of microphone components, enclosure, etc. Pickup pattern may also be referred to as polar pattern. It should be understood that when referring to a predefined microphone pickup pattern, this relates to pickup patterns of microphones of the microphone array. Contrarily, when referring to predefined mixed pickup patterns, this relates to pickup patterns formed by combining/mixing two or more predefined microphone pickup patterns and, therefore, a multitude of predefined mixed pickup patterns may be achieved by mixing predefined microphone pickup patterns and predefined mixed pickup patterns. Advantageously, the microphone array of the invention may utilize these predefined mixed pickup patterns to improve sound recording, by selecting an optimal pickup pattern among the predetermined pickup patterns that best suit a given recording situation, e.g., selecting a pickup pattern that is sensitive in the direction of a sound to record, e.g., a voice, while being substantially less sensitive to sound from other directions.

An optimal pickup pattern may be a predefined pickup pattern associated with a level characteristic of a microphone audio signal or a mixed audio signal that provides the highest signal to noise ratio, such as, e.g., a signal to ambient noise ratio, in a particular recording situation. The level characteristic may comprise a full audio signal or a subset of the audio signal. In the case where a level characteristic is the full audio signal, the level is simply determined for the individual audio signals, and the signal providing the highest level determines the optimal pickup pattern as the predefined pickup pattern associated with this audio signal. Level may, e.g., be measured as a root mean square of the audio signal, it may be measured as loudness, signal peak, or other measures of level. In other implementations of the invention, the optimal pickup pattern may be selected with respect to a one or more level characteristics. For example, level characteristics may, thus, refer to, e.g., particular predetermined frequency bands of an audio signal, or may refer to a particular sound, such as a voice or an instrument or animal sound that is identified in one or more microphone audio signals and/or in one or more mixed audio signals. Thus, in a first step, the level characteristic is identified and then in a subsequent step, the level of the identified level characteristic is determined. The level of each of the identified level characteristics are then compared and the optimal pickup pattern is selected as the predefined pickup pattern that is associated with the level characteristic with the highest level. Thereby, the particular recorded sound, e.g., a voice may advantageously be identified as a level characteristic and then the level of the identified voice is determined and utilized to identify the optimal pickup pattern. Advantageously, the optimal pickup pattern may thereby be the pickup pattern of the predefined pickup patterns that provides the highest signal to ambient noise ratio, wherein the signal is considered the identified voice and ambient noise is considered anything that is not the identified voice.

The predefined pickup patterns are predefined in the sense that they can be defined before the microphone array of the invention is activated and utilized for recording audio and for determining an optimal pickup pattern. The predefined pickup patterns and/or representations of the predefined pickup patterns such as, e.g., instructions on how to mix microphone pickup patterns to achieve mixed pickup patterns, may thus in some implementations of the invention be obtained and stored on the microphone array, e.g., in a memory implemented in the array, and thereby be provided as pickup patterns, which may advantageously be selected as an optimal pickup pattern, depending on sound recorded in a given recording situation. The predefined pickup patterns comprise predefined mixed pickup patterns. The predefined mixed pickup patterns may be obtained by combining/mixing the predefined microphone pickup patterns, e.g., by linear combinations and/or nonlinear combinations of the predefined microphone pickup patterns. Further predefined mixed pickup patterns may even be established by mixing predefined mixed pickup patterns. This may advantageously provide a multitude of predefined pickup patterns, which in term provide a flexible microphone array, which may be fine-tuned to record in various different environments.

Optionally, the optimal pickup pattern may be selected taking into account pre-measured audio data, including one or more voices, instrument sounds, animal sounds, or other sounds of interest to a user. Thereby, the optimal pickup pattern may be selected as the predetermined pickup pattern associated with an audio signal that closest matches the sound characteristics, or with regards to voice, a voice characteristic of, e.g., a voice of the pre-measured audio data. Voice characteristics may, e.g., refer to frequency characteristics and/or occurrence of voice features.

Communicative connections between microphones, audio processing units etc. may typically be implemented through wired connections, but may in principle also be wireless, e.g., Bluetooth or even Wi-Fi or radio communication and/or other wireless connections.

Optionally, the invention may provide an audio output associated with an optimal pickup pattern comprising a representation of the recorded sound. This signal may optionally be transmitted to, e.g., a loudspeaker for reproduction and/or to a recording device for storing the recorded sound. Such reproduction may typically be real-time reproduction but may in principle also be delayed slightly by processing or as mentioned be recorded to be reproduced later, e.g., recording of a podcast.

An important feature of the invention is to determine an optimal pickup pattern. As mentioned, this may be facilitated by an audio processing unit. The audio processing unit may for example be a digital signal processor, or it may be several digital signal processors, or even a central processing unit controlling multiple microphone arrays according to the invention.

The microphone array of the invention may advantageously be implemented as a handheld, table-top or boom-mounted microphone array, or it may be implemented in cell phones, tablets, personal computers, conference microphone systems, live music PA systems, in studio recording systems, and the like, to record sound from sound sources from different positions with respect to the microphones of the mentioned devices. Irrespective of the implementation, the invention may advantageously select an optimal pickup pattern for sound recording of the sound, to ensure an optimal signal to ambient noise ratio.

It should be understood that the various audio signals described in relation to the invention may be digital or analogue signals, depending on the particular implementation. For example, it may be preferred to perform audio processing, including mixing of audio signals and determining an optimal pickup patter, utilizing digitalized audio signals. Therefore, as mentioned, the microphone signals may be converted from analog to digital using an analog to digital converter, prior to mixing and/or prior to further audio processing/analysis. Thus, analog to digital conversion may be applied at different steps in the audio processing pipeline. For example, before mixing the audio signals, before analyzing the mixed audio signals to determine an optimal pickup pattern, etc.

In the following, various embodiments of the invention are described with reference to the figures.

FIG. 1 illustrates a block diagram of a microphone array 100 according to an embodiment of the invention. The microphone array comprises two microphones 1a, 1b, a mixer block 3, an audio analyzer block 5 and predefined pickup patterns 15.

In this embodiment, the two microphones 1a, 1b are condenser microphones both featuring a cardioid pickup pattern (polar pattern). The microphones are arranged in a 90-degree position with respect to one another, and thereby the microphones are sensitive toward sound from different directions, which advantageously widens the achievable pickup pattern of the microphone array 100 compared to microphone arrays with microphones arranged to point in equal direction. The microphones are connected to the mixer block 3, to which each microphone provides a microphone audio signal 2a, 2b comprising a representation of a sound 101 recorded by each microphone. Upon receiving the microphone audio signal, the mixer block mixes the two audio signals in accordance with predefined mixed pickup patterns of a plurality of predefined pickup patterns 15 that also comprises the predefined microphone pickup patterns. In this exemplified embodiment, the predefined microphone pickup patterns refer to the above-mentioned cardioid pickup pattern of the two microphones. The cardioid predefined microphone pickup patterns 14a and 14b are illustrated in FIG. 2.

The predefined mixed pickup patterns 15 of the present embodiment is established by linear combinations of the two cardioid microphone pickup patterns. This means that mixed audio signals associated with a given linear combination of pickup patterns can be obtained by a similar linear combination of the microphone audio signals. In this embodiment, a first mixed predefined pickup pattern of the predefined pickup patterns 15 is achieved by summing of the two predefined microphone pickup patterns. FIG. 2 illustrates predefined microphone pickup patterns 14a, 14b of the two microphones 1a, 1b and associated examples of predefined mixed pickup patterns. The predefined mixed pickup pattern 14c is achieved by summing the two predefined microphone pickup patterns 14a, 14b. The microphone pickup patterns both have a similar cardioid shape, but that the two microphone pickup patterns have their own particular directionalities, which refer to the respective directions in which the microphones are most sensitive. The summation of the two predefined microphone pickup patterns 14a, 14b advantageously results in a predefined mixed pickup pattern 14c that has a different directionality compared with the pickup patterns of the two individual predefined microphone pickup pattern. The second predefined mixed pickup pattern 14d of the predefined pickup patterns 15 is achieved by subtracting the two predefined microphone pickup patterns 14a, 14b. This particular predefined mixed pickup pattern has bidirectional pickup pattern 14d. When utilizing the bidirectional pickup pattern, the microphone array becomes sensitive in two opposite directions, which is advantageous in situations where it is desirable to record sound from two opposite directions, while limiting recording of sound from other directions.

Figure 2:
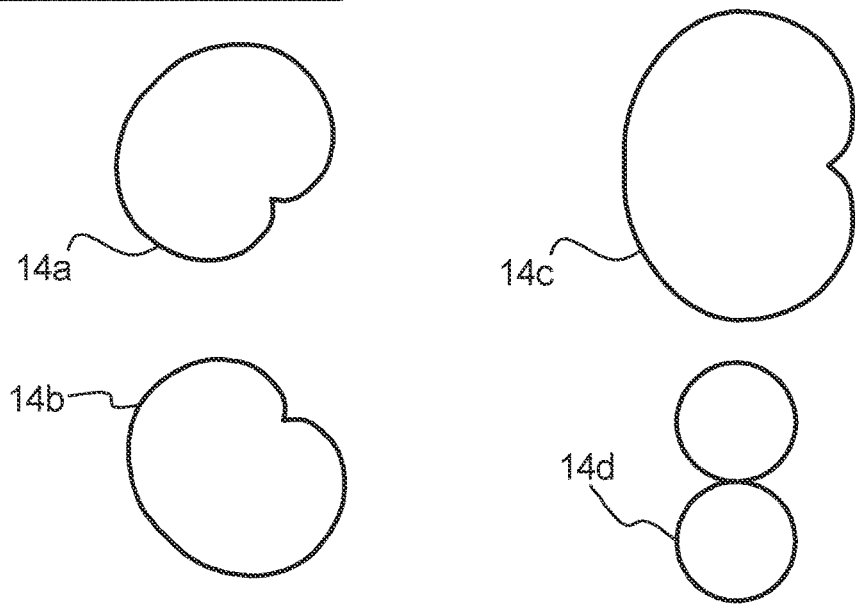
FIG. 2 illustrates predefined microphone pickup patterns and predefined mixed pickup patterns, according to embodiments of the invention.

To establish audio signals associated with these two above mentioned predefined mixed pickup patterns, the mixer block 3 sums the two microphone audio signals 2a, 2b to establish a first mixed audio signal 4a associated with the mixed cardioid pickup pattern 14c illustrated in FIG. 2. Meanwhile, a second mixed audio signal is established with the mixer block 3, which subtracts the two microphone audio signals to establish a second mixed audio signal 4b associated with the mixed bidirectional pickup pattern 14d, illustrated in FIG. 2. Thus, four audio signals, each based on a different pickup pattern and each comprising a representation of a recorded sound, is established. These audio signals are received by the audio analyzer block 5, which is communicatively coupled to the mixer block 3.

The audio analyzer block receives the mentioned audio signals from the mixer and determines individual level characteristics of the respective individual microphone audio signals and of the respective individual mixed audio signals. The analyzer block 5 then compares the determined individual level characteristics, to select an optimal pickup pattern. In this exemplified embodiment the level characteristic is a root mean square (RMS) of the recorded audio signal. Thus, the audio analyzer block 5 calculates an RMS for each of the microphone audio signals and of the mixed audio signals, and then compares the RMS of the signals to detect the audio signal with the highest RMS. The audio analyzer block then selects the pickup pattern of the predefined pickup patterns associated with the audio signal with the highest RMS as the optimal pickup pattern. In this example, since the sound 100 is emanating toward the microphones from a position in between the two microphones 2a, 2b at an angle of approximately +/−45 degrees respectively, with respect to the center of the front of the two microphones, the RMS of the audio signal associated with the mixed cardioid pickup pattern 14c illustrated in FIG. 2, and achieved by summation of the two microphone audio signals, has the highest RMS value, and the audio analyzer block 5 therefore selects this pickup pattern among the predetermined pickup patterns 15, as the optimal pickup pattern. The directionality of the selected optimal pickup pattern is pointing in the direction of the sound 101.

Optionally, an optimal pickup pattern signal 6, comprising information of the selected optimal pickup pattern is provided by the audio analyzer block.

Optionally, further predefined mixed pickup patterns may be established by, e.g., addition and division of predefined microphone pickup patterns, such as by non-linear combinations of predefined microphone pickup patterns.

Optionally, the mixing of audio signals may also comprise filtering using different audio filters with filter coefficients determined based on predetermined pickup patterns. Filters may, e.g., comprise finite impulse response (FIR) filters and infinite impulse response (IIR) filters.

Optionally, some embodiments of the invention may be implemented using different types of level characteristics, including, e.g., loudness of the audio signal, signal peak, voice activity etc.

FIG. 2 illustrates examples of predefined microphone pickup patterns and predefined mixed pickup patterns according to embodiments of the invention. It should be understood that while two or more predefined pickup patterns may have identical shape (also referred to as pattern), e.g., a cardioid shape, these pickup pattern may be considered different if they have different directionality, wherein directionality refer to the direction in which the pickup pattern points. In the present context, directionality of a pickup pattern refers to the direction in which the pickup pattern is most sensitive. If a pickup pattern is omni directional it has no directionality. If a pickup pattern is bidirectional, this pickup pattern thus has two directionalities, pointing in opposite directions, as illustrated by the predefined mixed pickup pattern 14d of FIG. 2.

In optional embodiments of the invention, each predefined pickup pattern is associated with a shape and with a directionality, and at least two predefined pickup patterns from the list of predefined pickup patterns comprises identical shape (e.g., cardioid) but different directionality; and wherein at least two predefined pickup patterns of said list of predefined pickup patterns comprise identical directionality but different shape. This is advantageous in that it provides multiple different pickup patterns that each is tailored to record sound (and deflect sound) from various different directions, thereby providing a flexible microphone array that may provide high signal to ambient noise ratio recordings of sound emanating from many different directions with respect to the microphone array, while keeping processing power at a minimum.

While the microphone pickup patterns and mixed pickup patterns of FIG. 2 have already been described in relation to the embodiment illustrated in FIG. 1, it should be understood that the microphones of a microphone array according to the invention may feature further different predefined pickup patterns, which may be mixed to establish even further different predefined mixed pickup patterns. Moreover, the microphone array of the invention may comprise microphones, each having different microphone pickup patterns. For example, one microphone may have a cardioid pickup pattern, while another microphone of the microphone array may, e.g., have a hypercardioid pickup pattern. Furthermore, depending on the implementation of the invention, the microphone array may comprise various number of microphones. For example, the microphone array may comprise three, four, five or between five and ten microphones, or even more. Thus, microphone arrays according to the invention may utilize identical microphones with identical pickup patterns, or a host of microphones with different microphone pickup patterns. Nonlimiting examples of microphone pickup patterns that can be implemented in a microphone array according to the invention includes omnidirectional pickup pattern, bidirectional pickup pattern, cardioid pickup pattern, supercardioid pickup pattern, hypercardioid pickup pattern, ultracardioid pickup pattern, to name a few.

Different types of microphones can be implemented in the microphone array, e.g., to tailor the frequency response and/or sensitivity in accordance with different specific use cases of the microphone array, which is advantageous. Non-limiting examples of microphone types that can be implemented according to the invention includes condenser microphones, dynamic microphones, ribbon microphones, fiber optic microphones, carbon microphones, liquid microphones, electret microphones, laser microphones and crystal microphones.

The microphones of the microphone array according to the invention may be positioned in various ways with respect to one another. In some implementations of the invention, all microphones may be positioned with the front of the microphone pointing in the same direction, while in other embodiments the microphones may be angled with respect to each other. In further implementations of the invention, the microphones are not positioned in a straight-line line array, but instead, the microphones may be positioned in, e.g., a circular array, which may advantageously provide a flexible microphone array capable of tailoring a pickup pattern of the array even more accurately toward sound from any direction.

Figure 3:
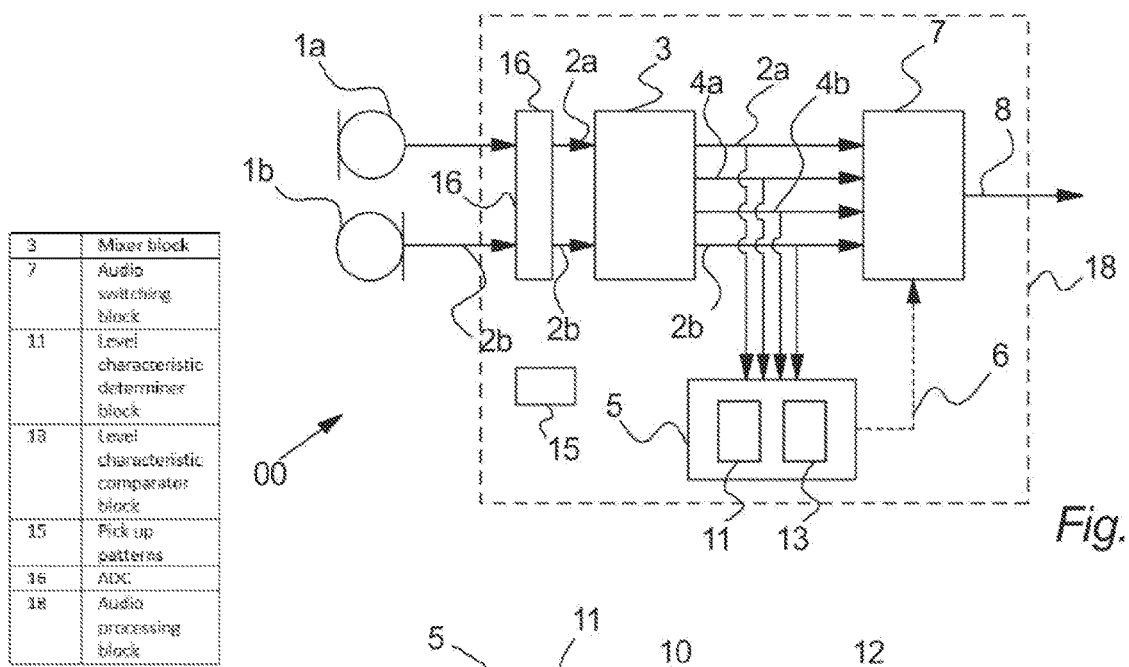
FIG. 3 illustrates a block diagram of a microphone array with a switching block according to the invention.

FIG. 3 illustrates a block diagram of a microphone array 100 according to an embodiment of the invention. The embodiment of FIG. 3 may be interpreted as an extension of the embodiment illustrated in FIG. 1, comprising additional optional features and microphones positioned differently with respect to one another. Thus, it should be understood, that in some implementations of the invention, optional features associated with the embodiment described in relation to FIG. 1 may optionally be implemented as optional features of the embodiment illustrated in FIG. 3 and vice versa. As with other embodiment of the invention, the embodiment of FIG. 3 is capable of selecting an optimal pickup pattern of a microphone array. However, in this particular embodiment of the invention, audio processing is performed by the audio processing unit 18, comprised by the microphone array. This is advantageous in that it has the effect that the microphone array may perform the method of selecting an optimal pickup pattern of the microphone array, without requiring any communications with one or more external audio processing units, thereby making installation of the array less complicated and less error prone.

In addition to the two microphones 1a, 1b, mixer block 3, audio analyzer block 5 and predefined pickup patterns 15 also comprised by the embodiment described in relation to FIG. 1, the embodiment illustrated in FIG. 3 comprises an analog to digital converter (ADC) 16 and an audio switching block 7, and the audio analyzer block 5 comprises a level characteristics determiner block 11 and a level characteristics comparator block 13. The ADC 16, mixer block 3, audio analyzer block 5 and the switching block 7 is all comprised by an audio processing unit 18.

The microphones 1a, 1b are oriented in opposite directions to enable recording of sound from these opposite directions. The microphones are connected to the ADC, which receives the microphone audio signals from the microphones and converts them to digital microphone audio signals comprising a digital representation of the microphone audio signals. The digital microphone signals are then provided to the mixer unit, which as in previously described embodiments mixes the two digital microphone audio signals in accordance with predefined mixed pickup patterns of a plurality of predefined pickup patterns 15 that also comprise the predefined microphone pickup patterns. As previously described (see, e.g., the description of FIG. 1), the audio mixer provides the microphone audio signals and the mixed audio signals to the audio switching block and to the audio analyzer block 5, which is communicatively coupled to the mixer block 3. The level characteristics determiner block 11 of the audio analyzer block 5 then first identifies a characteristic of the received audio signals, which in this case includes filtering the received audio signals with a bandpass filter to establish new audio signals comprising a particular frequency band associated with human voice, e.g., form 400 Hz to 2000 Hz, such as from 200 Hz to 4000 Hz, such as from 400 Hz and 6000 Hz. The levels of these filtered audio signals are then determined. Here the level is measured as loudness. The loudness measurements are then received by the level characteristics comparator block 13, which compares the levels of the filtered audio signals and determines an optimal pickup pattern of the microphone array 100 as the predefined pickup pattern of the predefined pickup patterns 15, which is associated with the filtered audio signal with the highest level. The audio analyzer 5 then outputs an optimal pickup pattern signal 6, comprising information of the optimal pickup pattern. The optimal pickup pattern signal 6 is received by the audio switching block 7. Based on the received optimal pickup pattern signal 6, the audio switching block 7 then switches from a given activated audio signal, to the audio signal of the received microphone audio signals and mixed audio signals that is associated with the selected optimal pickup pattern, as output audio 8. Thereby the optimal pickup pattern becomes an activated pickup pattern. Thus, in this embodiment, the process of selecting an optimal pickup pattern, and providing an audio output associated with the optimal pickup pattern, is fully automatic.

In this embodiment, the activated pickup pattern may be updated according to an optimal pickup pattern during a recording of a sound, if a new optimal pickup pattern that is different to the activated pickup pattern is identified. This advantageously ensures that the optimal pickup pattern is always selected as the activated pickup pattern.

Figure 4:
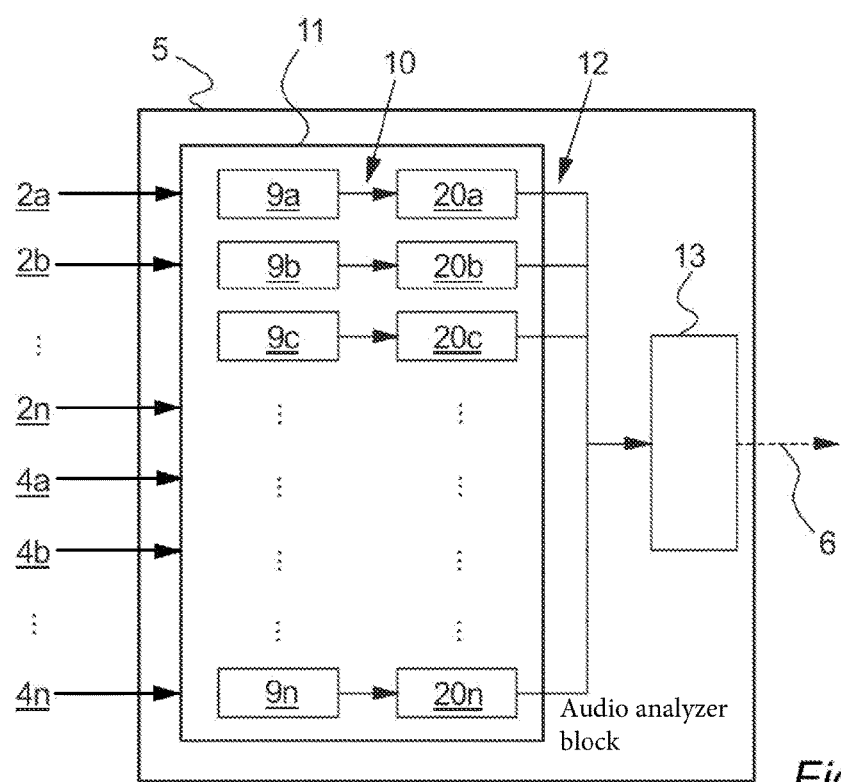
FIG. 4 illustrates an audio analyzer block with voice activity detection according to an embodiment of the invention.

FIG. 4 illustrates a block diagram of an audio analyzer block 5 comprising a level characteristics determiner block 11, which comprises voice activity detector blocks 9*a-n*, level determiner blocks 20*a-n* and a level characteristics comparator block 13, according to an embodiment of the invention. The audio analyzer block 5 of FIG. 4 may be implemented as a feature in various other embodiments of the invention, to determine an optimal pickup pattern of the microphone array, utilizing voice activity detection. The particular features of the audio analyzer block 5 illustrated in FIG. 4 may thus be understood as optional features of the invention, which may be preferably implemented, e.g., when the microphone array is utilized for recording voice/speech.

In this exemplified embodiment, the analyzer block receives from the mixer block (not shown) a plurality of microphone audio signals 2*a-n* and a plurality of mixed audio signals 4*a-n*. All of these audio signals are received by the voice activity detector blocks 9*a-n*, which analyze the audio signals using voice activity detection, to determine a voice activity audio signal for each of the received audio signals 2*a-n*, 4*a-n*. The voice activity detector blocks 9*a*-9*n* essentially extract sound pertaining to voice, such as human speech or even human singing from a received audio signal and then output a voice activity audio signal 10 comprising the extracted voice. Advantageously, the noise content in the voice activity audio signal is thereby diminished. Voice activity may be detected in various ways. For example, voice activity may be detected by extracting one or more frequency bands pertaining to the frequency bands comprising human voice, by filtering the received audio signals. Voice activity detection may also be performed by comparing the received audio signals with premeasured audio signals of different voices. The comparison may comprise correlation of the signals, or it may comprise machine learning based speech recognition, e.g., utilizing supervised or potentially unsupervised, semi-supervised or reinforcement learning. However, methods utilizing little processing power is preferred. Alternatively, supervised learning algorithms that require large processing power may be trained on an external system utilizing the premeasured data, and then the trained classifier may be implemented on the microphone array of the invention to provide voice activity detection. The methods may comprise bayes classification methods, including naïve bayes, support vector machines, different types of neural networks, decisions trees, or even unsupervised methods including different types of clustering or autoencoder networks.

In this exemplified embodiment, the voice activity detector blocks 9*a-n* comprises a noise reduction stage that denoises the received audio signal, a feature extraction stage that extracts quantities as features from a section of the received denoised audio signal, and a classification stage that classifies the section as voice or non-voice, when one or more of the extracted features exceeds a threshold. The noise reduction stage includes a spectral subtraction wherein the noise spectrum is estimated during speech pauses and is then subtracted from the noisy speech spectrum to estimate the clean speech.

The individual voice activity detector blocks output individual voice activity audio signals, which comprise the detected voice. The individual voice audio signals are received by individual level determiner blocks 20*a-n*, which determine the voice activity signal level of each of the received signals. The voice activity signal level of the individual signals may as previously described be determined in various ways, however, in this example, it is determined as the RMS. The voice activity signal level (the RMS) of the individual signals is received by the level characteristics comparator 13, which compares all the voice activity signal levels, to determine the voice activity audio signal 12 with the highest level. The level characteristics comparator then selects the optimal pickup pattern, as the pickup pattern associated with the voice activity signal with the highest level (RMS), and finally outputs an optimal pickup pattern signal 6. The optimal pickup pattern signal 6 comprises information of the optimal pickup pattern, selected by the audio analyzer block 5. The information about the optimal pickup pattern in the signal 6 may in an embodiment simply be a channel number or other reference to the audio channel that comprises the audio signal which resulted in the highest level.

The decision rule for determining voice activity may optionally, e.g., be based on a frame by frame basis using instantaneous measures of the divergence distance between speech and noise. Different measures can be used according to the invention, including include spectral slope, correlation coefficients, log likelihood ratio, cepstral, weighted cepstral, and modified distance measures.

Optionally the voice activity detection may provide a feedback, in which the voice activity detection decision is used to improve the noise estimate in the noise reduction stage, or to adaptively vary the threshold(s) in the classification stage. Advantageously, these feedback operations improve the voice activity detection performance in, e.g., non-stationary noise (i.e., when the noise varies a lot).

In an optional advanced stage, the feedback mechanism, including user feedback, is utilized as feedback to a reinforcement learning algorithm, to optimize the voice activity detection, in particularly advanced embodiments, wherein voice activity detection comprises reinforcement learning.

Optionally, the voice activity detector block may be calibrated based on pre-recorded sound data comprising voice recording of different individuals. Preferably, these individuals are of different gender, and represent different sounding voices, e.g., voices with different pitch, level, and variation in pitch and level over time (phrasing).

Optionally, the calibration of the voice activity detector blocks 9*a-n* may comprise pre-recorded sound data comprising recordings of a user that intends to use the microphone array of the invention. Advantageously, this calibration ensures that the voice activity detector may learn features and/or a representation resembling the voice of that user, and thereby the voice activity detector 5 may improve the accuracy and/or sensitivity of the voice activity detection when that user is using the microphone.

Optionally voice activity detection may be performed by a bandpass filter with a bandwidth and center frequency corresponding to desired human voice characteristics, e.g., with a frequency band ranging from 300 Hz to 3500 Hz, or alternatively from 200 Hz to 6000 Hz. The frequency band may be chosen to be even narrower to eliminate contaminating noise.

Optionally, the method comprises a step of calibrating said microphone array according to an average voice level based on premeasured voice recording data.

Optionally, the voice activity detection is calibrated according to an average voice characteristics frequency response of premeasured voice recording data.

In advanced optional implementations of the invention, the voice activity detection may be configured to be utilized to identify other sounds such as sounds from instruments, sound from an audience, music etc.

Several other voice activity detection methods are known by the skilled person within the field of voice recognition, and these method may also be implemented with the invention.

The feature of voice activity detection is generally advantageous in that it has the effect of ensuring that the optimal pickup pattern is selected based on voice activity identified with voice activity detection, and not based on, e.g., irrelevant ambient noise, which would produce a less than desirable result. Voice activity may refer to any relevant voice that is recorded with the microphones and identified with voice activity detection. For example, a relevant voice activity may be a voice generated by a human. Advantageously, the microphone array may thus determine the optimal pickup pattern according to the voice activity and thereby the quality of the sound recorded with the microphone array is improved compared to a situation where ambient noise would influence the microphone audio signals to a much larger degree, and thereby deteriorate the detection of the optimal pickup pattern. For example, by utilizing voice activity detection, the signal to ambient noise ratio may be improved, which is advantageous.

Figure 5:
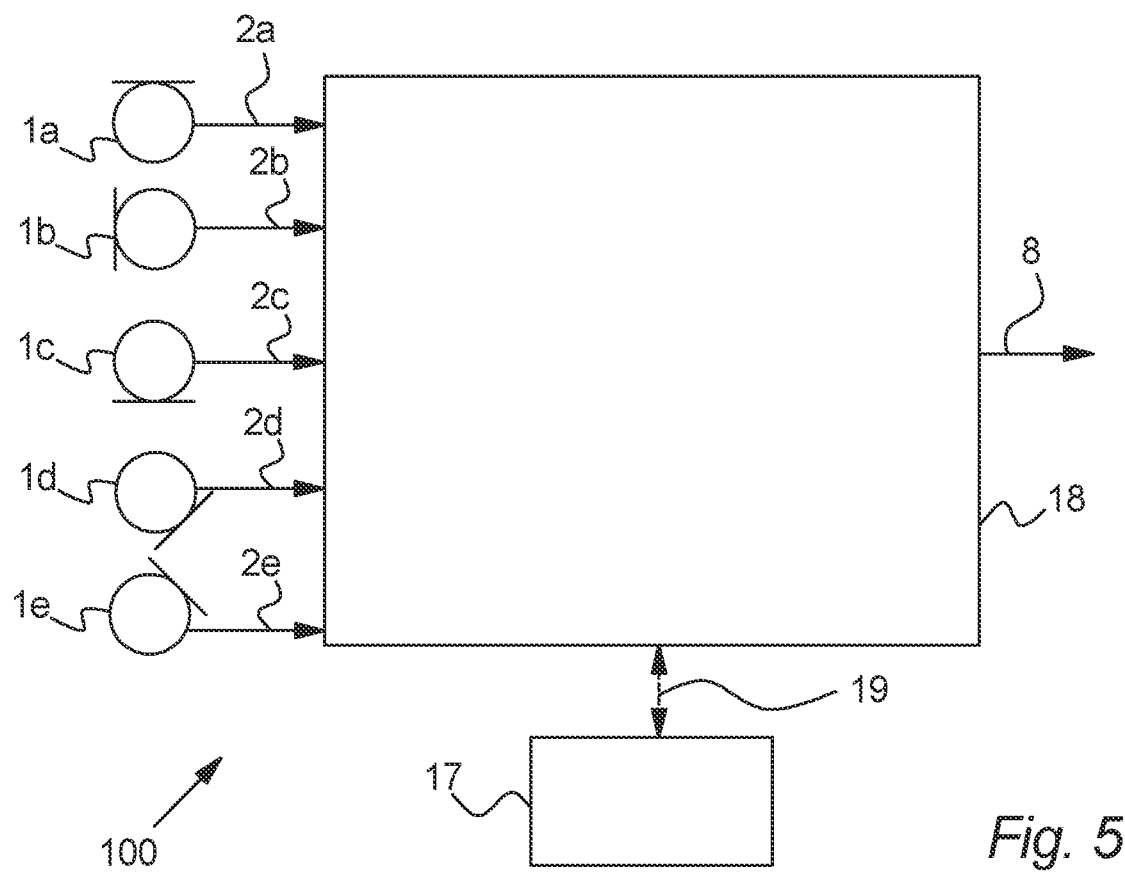
FIG. 5 illustrates a microphone array with an audio processing unit and a user interface, according to an embodiment of the invention.

FIG. 5 illustrates a block diagram of a microphone array 100 according to an embodiment of the invention. This invention comprises features, which may be implemented together with features of other embodiments of the invention. Thus, this embodiment may be considered an optional extension of, e.g., the previously described embodiments of FIGS. 1-4, including optional features described in relation to these embodiments.

The embodiment of FIG. 5 comprises five microphones 1*a-e*, an audio processing unit 18 and a user interface 17 communicatively coupled to the audio processing unit 18 via a data communication link 19, which facilitates two-way communication between the user interface and the audio processing unit. The five microphones are oriented in different directions, to enable the microphone array 100 to be sensitive to sound from any of the directions that the microphones point in, as well as from directions in-between these directions in accordance with predefined mixed pickup patterns. The four microphones are connected to the audio processing unit 18, to which they each provide a microphone audio signal 2*a-e*. As previously described in relation to other embodiments of the invention, the audio processing unit 18 mixes the microphone audio signals in accordance with predefined mixed pickup patterns, and determines an optimal pickup pattern based on comparisons of different level characteristics of the microphone audio signals and of the mixed audio signals. The audio processing unit provides information to the user interface of the selected optimal pickup pattern, via the data communication link.

Meanwhile, the audio processing unit provides an audio output 8, associated with an activated pickup pattern. The activated pickup pattern may be automatically selected by the audio processing unit 18, as the audio signal corresponding to the selected optimal pickup pattern. However, the activated pickup pattern may also be selected by a user via the user interface.

Based on this information, the user interface may indicate to a user, whether the optimal pickup pattern is the activated pickup pattern. This may be done via a light source on the user interface, which lights up in a particular color when the optimal pickup pattern and the activated pickup pattern is identical. If this is not the case, the light source may change either color, start flashing or in other ways start indicating that the optimal pickup pattern is not activated. Other ways of alarming a user when an optimal pickup pattern is not activated includes by sound, via a screen of the user interface, via haptic feedback to a user touching the microphone, via vibrations of the microphone array etc.

It should be understood that an activated pickup pattern that is based on said optimal pickup pattern may refer to a pickup pattern selected by a user, based on knowledge of the selected optimal pickup pattern. Thus, in some embodiments of the invention, the activated pickup pattern may correspond to a selected optimal pickup pattern. Alternatively, the activated pickup pattern may correspond to a pickup pattern selected by a user in a user interface, based on the optimal pickup pattern.

As mentioned, the user interface may be configured to enable a user to select a predefined pickup pattern as the activated pickup pattern. Advantageously, the user may be informed of the optimal pickup pattern via the user interface, and thereby the user is able to select an optimal pickup pattern based on this information, or a different predefined pickup pattern, if the user so desires.

Optionally, the user interface is configured to indicate an optimal pickup pattern, as well as a subset of different recommended pickup patterns of the predefined pickup patterns, based on a list of predefined pickup patterns and additional recommended pickup patterns. The user may then be able to try out different pickup patterns based on the recommended pickup patterns, which are predefined pickup patterns with associated level characteristics that come close to the level characteristics associated with the selected optimal pickup pattern. The recommended pickup patterns could, e.g., be the second, third and fourth most optimal pickup patterns, determined based on level characteristics.

Optionally, the user may, via the user interface 17, overrule a selected optimal pickup pattern. This advantageously has the effect that the user may control the pickup pattern according to personal preferences.

Optionally, the optimal pickup pattern may be selected based on different level characteristics, which may be selected via the user interface. Level characteristics may, e.g., include voice activity level, RMS of the audio signals, loudness of the audio signals, etc.

It should be understood that the user interface 17 is communicatively coupled to said audio processing unit 18, and thereby to the components and/or blocks comprised by the audio processing unit. Thereby, the user interface 17 is configured to control a switching block according to a pickup pattern selected by a user via said user interface.

The user interface 17 may comprise a layout of buttons and indicator lights. However, the user interface 17 may also be a screen, such as a touch screen, wherein the functionality of the user interface 17 is operated by the user via the touch screen.

Figure 6:
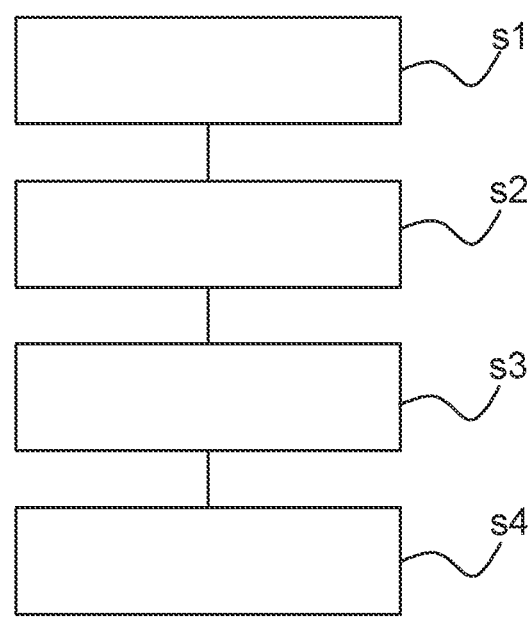
FIG. 6 illustrates method steps according to an embodiment of the invention.

FIG. 6 illustrates method steps according to an embodiment of the invention. The illustrated method steps are the steps of a method of selecting an optimal pickup pattern of a microphone array comprising at least two microphones, which are both associated with a predefined microphone pickup pattern, and wherein the optimal pickup pattern is selected form a list of predefined pickup patterns comprising the predefined microphone pickup patterns and predefined mixed pickup patterns, and wherein the method comprises at least the following four steps.

In an initial method step S1, a microphone audio signal is received from each of the at least two microphones, to establish a plurality of microphone audio signals.

In a next step S2, the microphone audio signals are mixed in accordance with the plurality of predefined mixed pickup patterns to establish a plurality of mixed audio signals.

In a further step S3, individual level characteristics of respective individual microphone audio signals of the plurality of microphone audio signals and of respective individual mixed audio signals of the plurality of mixed audio signals are determined.

In an additional step S4, an optimal pickup pattern is selecting from the list of predefined pickup patterns based on the individual level characteristics.

Optionally, the mixed audio signals may be established based on linear combinations of at least two microphone audio signals of the plurality of microphone audio signals. This has the effect of providing audio signals resembling various different pickup patterns, which is advantageous. A further advantage is that the microphone array may provide an audio signal based on a pickup pattern associated with the linear combinations of the audio signals, thereby providing a flexible microphone array, which may provide various different audio signals based on various different pickup patterns and optimal pickup patterns.

Optionally, the method illustrated in FIG. 6 may comprise an optional step of alerting a user when the optimal pickup pattern is not active. This is advantageous in that the user can then become aware that the optimal pickup pattern is not active. In optional implementations of the invention, the user may advantageously utilize this information to select a different pickup pattern such as the optimal pickup pattern, via a user interface. The step of alerting a user when the optimal pickup pattern is not in use may exploit an indicator, such as a light source, e.g., an LED, to indicate that an optimal pickup patter is not active. The light source may start flashing in a certain pattern, and/or the light may change from a color to another color, to indicate that the optimal pickup pattern is not active. Many different indicators may be utilized according to implementations of the invention, including, e.g., sound via e.g. a speaker, combinations of sound and light, an indication via a user interface, such as via text and/or images shown on a screen of said user interface, etc.

Optionally, the described method may comprise a step of indicating the selected optimal pickup pattern in a user interface. This is advantageous in that it provides information of the optimal pickup pattern to a user of the microphone array.

Optionally, the method embodiment of the invention may comprise a step of switching an active pickup pattern to the optimal pickup pattern based on an input from a user interface. This is advantageous in that a user may select the optimal pickup pattern, if it is not already active.

Optionally, the method embodiment of the invention may comprise a step of automatically switching an active pickup pattern to the optimal pickup pattern. This is advantageous in that it ensures that the active pickup pattern is the optimal pickup pattern. Thus, if the microphone is turned on and the optimal pickup pattern is not selected, the microphone array automatically switches to the optimal pickup pattern, which is advantageous.

Optionally, the method embodiment may comprise a further step of providing an audio output based on a subset of the plurality of microphone audio signals in accordance with the optimal pickup pattern. This is advantageous in that the method may provide an audio output comprising a representation of a recorded sound that is based on an optimal pickup pattern. Thereby, the method may, e.g., provide an audio output with a higher signal to ambient noise ratio compared with, e.g., situations where suboptimal pickup pattern are used, which is advantageous.

Optionally, selecting the optimal pickup pattern from a list of predefined pickup patterns may comprise correlating individual level characteristics with one or more premeasured level characteristics. Thereby, the optimal pickup pattern is selected based on level characteristics of a sound that matches a premeasured sound. This advantageously has the effect that the selected optimal pickup pattern is optimal with regards to a particular sound and not with respect to, e.g., a different dominating sound, which a user may not want to record. In the present context, correlating should be understood in the broadest sense as a comparison to determine a degree of similarity or equality. Thus, it should be understood that correlated does not necessarily simply refer to a statistical correlation and different correlation coefficients. Premeasured could be a voice of a human voice, it could be different instrument sounds or other different sounds a user of the microphone array wants to record with the microphone array. The premeasured data may thus be acquired to calibrate the microphone array according to the premeasured data, and thereby the microphone array may be calibrated to be sensitive toward the premeasured sound and thereby to select an optimal pickup pattern associated with that premeasured sound.

It should be understood that optional features described in relation to particular embodiments of the invention may also optionally be implemented in any other embodiments of the invention. For example, features and optional features of the embodiments of FIGS. 3-6 may be implemented in the embodiment described in relation to FIG. 1 and vice versa. For example, the embodiment of FIG. 1 may optionally be implemented with additional microphones positioned in various directions, e.g., such as described in relation to the embodiment of FIG. 5. Likewise, the audio analyzer block described in relation to FIG. 4 may be implemented in any implementation of the invention. Furthermore, the user interface of the embodiment described in relation to FIG. 5 may be implemented in any other implementations of the invention.

The invention has been exemplified above with the purpose of illustration rather than limitation with reference to specific examples of methods and embodiments. Details such as a specific method and system structures have been provided in order to understand embodiments of the invention. Note that detailed descriptions of well-known systems, devices, circuits, and methods have been omitted so as to not obscure the description of the invention with unnecessary details. It should be understood that the invention is not limited to the particular examples described above and a person skilled in the art can also implement the invention in other embodiments without these specific details. As such, the invention may be designed and altered in a multitude of varieties within the scope of the invention as specified in the claims.

List of reference signs:

1a-1e Microphone
2a-n Microphone audio signal
3 Mixer block
4a-n Mixed audio signal
5 Audio analyzer block
6 Optimal pickup pattern signal
7 Audio switching block
8 Audio output
9a-n Voice activity detector block
10 Voice activity audio signal
11 Level characteristics determiner block
12 Voice activity signal level
13 Level characteristics comparator block
14a-b Cardioid microphone pickup pattern
14c Mixed cardioid pickup pattern
14d Mixed bidirectional pickup pattern
15 Predefined pickup patterns
16 Analog to digital converter
17 User interface
18 Audio processing unit
19 Data communication link
20a-n Level determiner block
100 Microphone array
101 Sound
S1-S4 Method steps

The invention claimed is:

1. A method of selecting an optimal pickup pattern of a microphone array comprising at least two microphones, including a first microphone and a second microphone, wherein said first microphone is associated with a first predefined microphone pickup pattern and said second microphone is associated with a second predefined microphone pickup pattern, and said optimal pickup pattern is selected from a list of predefined pickup patterns comprising said first and second predefined microphone pickup patterns and predefined mixed pickup patterns including at least a first predefined mixed pickup pattern and a second predefined mixed pickup pattern, and wherein said method comprises the steps of:
   receiving a microphone audio signal from each of said at least two microphones to establish a plurality of microphone audio signals which at least respectively correspond to a first microphone audio signal and a second microphone audio signal;
   mixing said plurality of microphone audio signals in accordance with said first predefined mixed pickup pattern to establish a first mixed audio signal, and mixing said plurality of microphone audio signals in accordance with said second predefined mixed pickup pattern to establish a second mixed audio signal;
   determining individual level characteristics of respective said first microphone audio signal, said second microphone audio signal, said first mixed audio signal and said second mixed audio signal, and based on each said individual level characteristics to select one audio signal with the highest level characteristic from a group of said first microphone audio signal, said second microphone audio signal, said first mixed audio signal and said second mixed audio signal;
   selecting said optimal pickup pattern which is associated with said one audio signal with the highest level characteristic from said list of predefined pickup.

2. The method according to claim 1, wherein said first and second mixed audio signals are established based on linear combinations of at least two microphone audio signals of said plurality of microphone audio signals.

3. The method according to claim 1, wherein said first and second mixed predefined pickup patterns are established based on linear combinations of said predefined microphone pickup patterns.

4. The method according to claim 1, wherein at least one of said first and second mixed audio signals is established by summing at least two microphone audio signals of said plurality of microphone audio signals.

5. The method according to claim 1, wherein at least one of said first and second mixed audio signals is established by subtracting at least two microphone audio signals of said plurality of microphone audio signals.

6. The method according to claim 1, wherein said optimal pickup pattern is a pickup pattern of said list of predefined pickup patterns with the highest individual level characteristic of said individual level characteristics of said predefined pickup patterns.

7. The method according to claim 1, wherein said step of selecting said optimal pickup pattern from said list of predefined pickup patterns comprises correlating individual said level characteristics with one or more premeasured level characteristics.

8. The method according to claim 1, wherein said predefined pickup patterns is associated with a pattern and with a directionality, and wherein at least two predefined pickup patterns from said list of predefined pickup patterns comprises identical patterns but different directionality; and wherein at least two predefined pickup patterns of said list of predefined pickup patterns comprises identical directionality but different patterns.

9. The method according to claim 1, wherein said method comprising a step of providing one output audio signal from said plurality of microphone audio signals and said plurality of mixed audio signals based on an activated pickup pattern.

10. The method according to claim 1, wherein said method comprises a step of alerting a user when said optimal pickup pattern is different from said activated pickup pattern.

11. The method according to claim 1, wherein said method comprising a step of indicating said selected optimal pickup pattern in a user interface.

12. The method according to claim 1, wherein said method comprising a step of selecting an activated pickup pattern based on an input from a user interface.

13. The method according to claim 1, wherein said method comprises a step of automatically selecting an active pickup pattern in correspondence with said optimal pickup pattern, and switching said output audio signal to at least one audio signal from said plurality of microphone audio signals and said plurality of mixed audio signals wherein said at least one audio signal is associated with said activated pickup pattern.

14. The method according to claim 1, wherein said level characteristic is a voice level characteristic based on individual voice activity detection of said respective individual microphone audio signals of said plurality of microphone audio signals and of respective individual mixed audio signals of said plurality of mixed audio signals.

15. The method according to claim 1, wherein said voice activity detection is calibrated according to an average voice level of pre-measured voice recording data.

16. A microphone array configured to select an optimal pickup pattern from a list of predefined pickup patterns comprising predefined microphone pickup patterns including a first predefined microphone pickup pattern and a second predefined microphone pickup pattern, and predefined mixed pickup patterns including a first predefined mixed pickup pattern and a second predefined mixed pickup pattern, wherein said microphone array comprises:
- at least two microphones, including a first microphone and a second microphone, wherein said first microphone is associated with a first predefined microphone pickup pattern and said second microphone is associated with a second predefined microphone pickup pattern;
- an audio mixer block communicatively coupled to said at least two microphones, and configured to receive a microphone audio signal from each of said at least two microphones, to establish a plurality of microphone audio signals which at least respectively correspond to a first microphone audio signal and a second microphone audio signal, and further configured to mix said plurality of microphone audio signals in accordance with said first predefined mixed pickup pattern to establish a first mixed audio signal and to mix said plurality of microphone audio signals in accordance with said second predefined mixed pickup pattern to establish a second mixed audio signal;
- an audio analyzer block communicatively coupled to said audio mixing block and configured to receive said first and second microphone audio signals and said first and second mixed audio signals;
- wherein said audio analyzer block is configured to determine individual level characteristics of respective individual said first microphone audio signal, said second microphone audio signal, said first mixed audio signal and said second mixed audio signal, and based on each said individual level characteristics to select one audio signal with the highest level characteristic from a group of said first microphone audio signal, said second microphone audio signal, said first mixed audio signal and said second mixed audio signal; and
- wherein said audio analyzer block is further configured to select said optimal pickup pattern which is associated with said one audio signal with the highest level characteristic from said list of predefined pickup patterns.

17. The microphone array according to claim 16, wherein said microphone array comprises an audio switching block configured to output one output audio signal from said plurality of microphone audio signals and said plurality of mixed audio signals based on an activated pickup pattern, wherein said activated pickup pattern is based on said optimal pickup pattern.

18. The microphone array according to claim 16, wherein said mixer block is configured to establish said plurality of mixed audio signals based on linear combinations of at least two microphone audio signals of said plurality of microphone audio signals.

19. The microphone array according to claim 16, wherein said optimal pickup pattern is a pickup pattern of said list of predefined pickup patterns with the highest individual level characteristic of said individual level characteristics of said predefined pickup patterns.

20. The microphone array according to claim 16, wherein said level characteristic is a voice level characteristic, and wherein said analyzer block comprises a level characteristics determiner block comprising a voice activity detector block and a level detector block, wherein said voice activity detector block is configured to individual voice activity detection of said respective individual microphone audio signals of said plurality of microphone audio signals and of respective individual mixed audio signals of said plurality of mixed audio signals, and wherein said level detector block is configured to establish said voice level characteristic based on said individual voice activity detection.

* * * * *